Nov. 6, 1962 H. A. SCHWARTZ 3,062,309
VEHICLE CONSTRUCTION
Filed Feb. 17, 1960 2 Sheets-Sheet 1
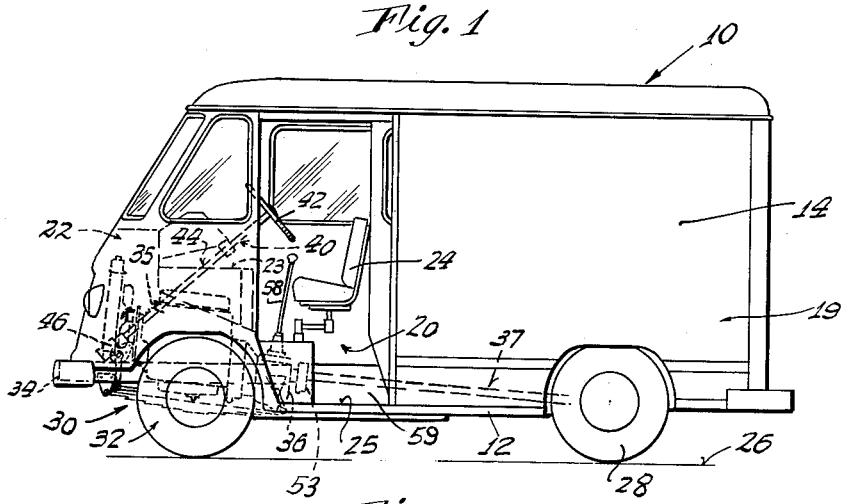
Fig. 1
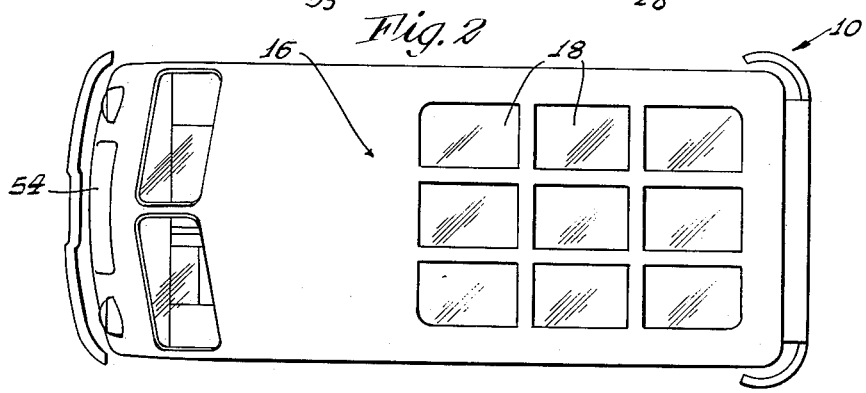
Fig. 2
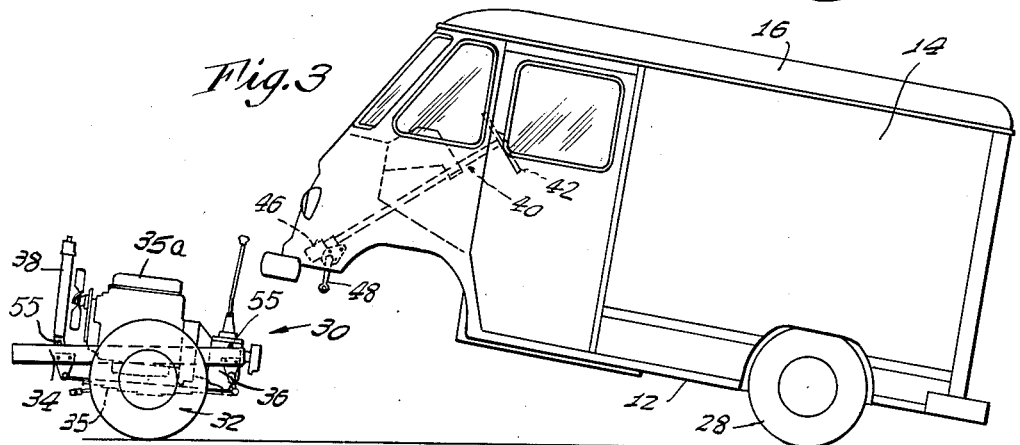
Fig. 3
Fig. 7
INVENTOR.
Harry A. Schwartz
BY
Munn, Liddy, Daniels & March
ATTORNEYS Nov. 6, 1962 H. A. SCHWARTZ 3,062,309
VEHICLE CONSTRUCTION
Filed Feb. 17, 1960 2 Sheets-Sheet 2
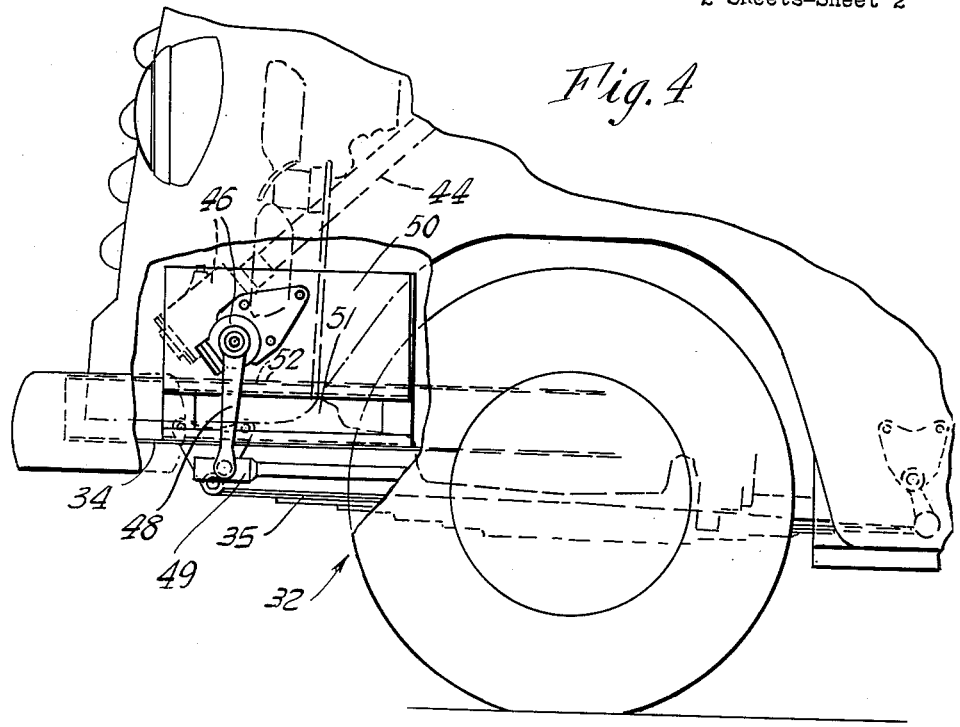
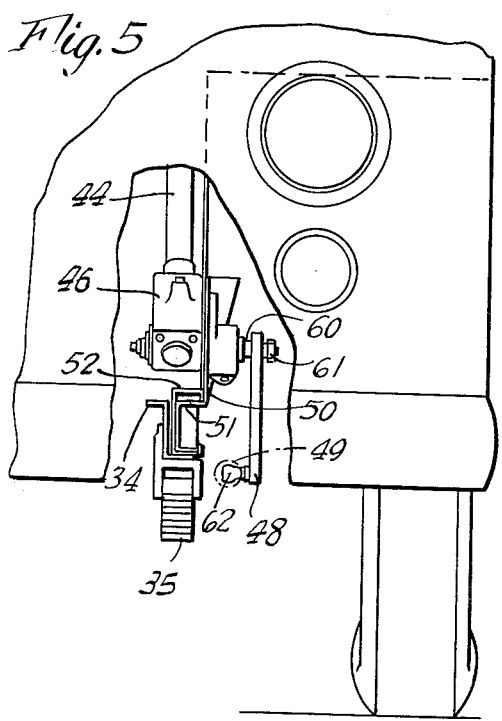
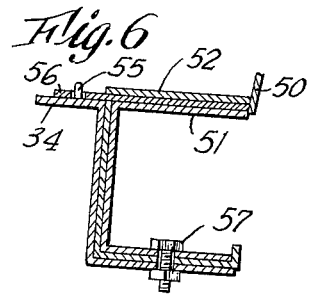
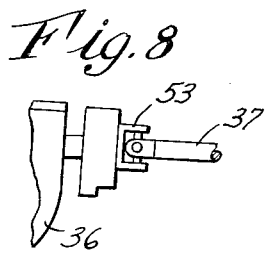
INVENTOR.
Harry A. Schwartz
BY
Munn, Liddy, Daniels & March
ATTORNEYS United States Patent Office 3,062,309
Patented Nov. 6, 1962

3,062,309
VEHICLE CONSTRUCTION
Harry A. Schwartz, Montpelier, Ohio, assignor, by mesne assignments, to The White Motor Company, Cleveland, Ohio, a corporation of Ohio
Filed Feb. 17, 1960, Ser. No. 9,360
5 Claims. (Cl. 180—11)

This invention relates in general to vehicles and in particular to a new and useful vehicle construction including a unitized chassis and a removable power driving unit therefor which is mounted on the forward wheel assembly and which may be rapidly assembled to and removed from the forward end of the chassis.

At the present time delivery trucks are used extensively for various purposes including, for example, the delivery of bread, milk, groceries and the like. The type of service involved imposes a heavy burden on the engine and the load carrying section of the body, and consequently, it becomes important to design the truck in a way to facilitate repairs without sacrificing the functional features for which the various parts or elements have been designed. In attempting to arrive at such a result, heretofore persons skilled in this art have been compelled to sacrifice either efficiency of performance or convenience of repair in the finished design, because the two factors were considered incompatible in the light of the hitherto needs or knowledge. Following an intensive program of study and work, quite unexpectedly it was discovered that the manner in which the parts of the truck were combined in the final design served not only to give optimum efficiency with respect to engine performance and utilization of space for delivery purposes, but also permitted or facilitated easy breakdown of the parts most frequently in need of repair during the life of the vehicle. The combination was also unique in permitting interchanging of parts with those from other trucks, with the result that a particular truck was out of service for less time in an overall time schedule than was ever realized heretofor. Another important advantage in the truck design of the present invention is the provision for the comfort of the driver with respect to body comfort in a sitting position, the ease with which the operator could rise from a sitting position, move away from the steering wheel and move to and from the driver's cabin.

Accordingly, it is an object of this invention to provide an improved enclosed load carrying vehicle.

A further object of the invention is to provide a load carrying vehicle including a body portion which may be raised for removal of the front wheel set and motor power unit.

A further object of the invention is to provide a vehicle body construction including integrally formed undercarriage and side frame members adapted to be supported on a rear wheel and axle set and to be removably connected to a forward power bogie having the power unit and the forward wheel set for the vehicle.

A still further object of the invention is to provide a vehicle which is simple in design, rugged in construction and economical to manufacture.

The present invention is directed to a multi-stop design type of delivery truck which includes an enclosed rear cargo space and a driver's compartment permitting a single step entrance from the ground. A feature of the construction is that there is provided a unitary frame construction for supporting both the chassis and body members. The frame construction includes a recessed forward underportion adapted to receive a removable power bogie. The power bogie includes the forward wheels for the vehicle which support an internal combustion engine. Steering mechanism is advantageously provided in the body portion for easy connection to the usual steering linkage for turning the wheels which support the power unit and provide the forward wheels of the vehicle. The arrangement is such that the forward end of the body may be jacked up and the power bogie removed for separate servicing and repair, and even replacement, if desired.

In addition to a construction which enables reduced downtime for the load carrying body, the invention provides a body construction which includes a unitary underframe and side body construction made of a material such as steel, and a separate roof assembly, made of a material such as fibreglass. The body includes a raised central driver's seat accessible from side aisles extending across the driver's compartment and arranged at a single step height above the roadway.

A more particular feature of the present invention is the construction of the vehicle body which includes a forward wheel frame power bogie which may be disconnected from the body to permit separate servicing and overhaul of the propulsion engine. To facilitate the removal or attachment of the power bogie from the vehicle body, the steering post extends to the forward lower end of the vehicle body and the steering gear assembly is located in an accessible position to permit easy connection of the sector shaft arm or pitman to the steering linkage which is held on the power bogie and connected to each of the wheels.

The power bogie advantageously includes aligning dowel-pins for cooperation with dowel holes in the body so that it is only necessary to align these portions when the bogie is to be assembled to the body. After the power bogie and the body are aligned, the steering mechanism is connected, and the drive shaft is connected to the transmission output shaft. Thereafter the power bogie is tightly bolted in place to the body.

The various features of novelty which characterize the invention are pointed out with particularity in the claims annexed to and forming part of this specification. For a better understanding of the invention, its operating advantages and specific objects attained by its use, reference should be had to the accompanying drawings and descriptive matter in which there is illustrated and described a preferred embodiment of the invention.

In the drawings:

FIG. 1 is a side elevational view of a vehicle constructed in accordance with the invention;

FIG. 2 is a top plan view of the vehicle;

FIG. 3 is a side elevational view similar to FIG. 1 but showing the forward end in a raised position and showing the power bogie removed;

FIG. 4 is a partial side elevation partly broken away indicating the steering mechanism connection to the power bogie;

FIG. 5 is a partial front elevation partly broken away indicating the steering mechanism connection to the power bogie;

FIG. 6 is an enlarged vertical sectional view of the body frame members shown in FIG. 5;

FIG. 7 is an enlarged, broken, outer side elevational view of the parts shown in FIG. 6; and FIG. 8 is a detailed view showing the universal connection between the power bogie and the transmission shaft.

Referring to the drawings in particular, the invention as embodied therein includes a multi-stop type delivery truck generally designated 10. The truck 10 includes an understructure 12 which includes rigid structural portions 50, 51 and 52 in FIGS. 4–7 for supporting both the body and the chassis members and is advantageously made of a material such as steel. The understructure includes upstanding structural portions provided to receive replaceable side panels 14 made of a reinforced plastic material. A roof panel assembly 16 is made of a structural plastic which includes translucent window portions 18.

In accordance with the invention the roof panel 16 is preferably removable and interchangeable and it is long enough to extend over a rear load compartment 19 which is coextensive with the side panels 14 and over a driver's compartment 22. The engine compartment 22 includes casing or covering 23, which is removable to afford access to the engine mechanisms where the latter are connected to the body at a location beneath the casing 23.

A driver's seat 24 is mounted on a rear portion of the casing 23. Access to the driver's seat 24 is by way of either a left or right access aisle 25 which is located at single-step height above the road level 26.

The truck 10 is supported by a rear wheel set 28 and by a removable power bogie generally designated 30. The power bogie 30 includes a wheel and axle set 32 upon which is supported a frame 34 by means of leaf springs 35. The frame 34 carries an internal combustion engine 35a and transmission unit 36 adapted to be connected by a suitable separable universal joint 53 to a drive shaft 37 held by the body understructure 12 and connected to the rear wheels 28 for propelling the vehicle. The power bogie 30 also includes a radiator 38 for the engine's cooling system and steering mechanism (not shown) connected to the wheels 32 and adapted to be connected to steering mechanism generally designated as numeral 40 carried in the truck body.

The steering mechanism 40 includes a steering wheel 42 connected to a steering post or column 44. The lower end of the post 44 includes a steering gear assembly 46 (FIG. 4) which includes a sector arm or pitman 48. All of this mechanism is mounted on the body. When the power bogie 30 is in place the pitman 48 is connected to a steering rod 49 which is connected to the wheels 32 to permit them to be turned by turning the steering wheel 42.

As is indicated more clearly in FIGS. 4 and 5, the pitman 48 is secured at one end to the shaft 60 forming part of the steering gear assembly 46 by a nut 61. At its other end it is provided with a member 62 adapted to be received in an opening provided in the associated enlarged end of the rod 49. The connection may readily be made by unscrewing nut 61 so that the member 62 may be engaged in the associated opening in the end of rod 49 and then screwing nut 61 back into tight position on shaft 60 to secure the connection between the pitman 48 and the rod 49.

A shaft arm 58 which is connected to the transmission for controlling the speed gears is received within an opening defined in the casing 23 at a location adjacent the driver's seat 24. The drive shaft 37 is located beneath a drive shaft tube portion 59 which extends between the casing 23 and the loading compartment 19.

The truck body advantageously includes a central front opening 54 behind which the radiator 38 is located where the power bogie 30 is connected to the bottom of the body. Suitable grillwork (not shown) is advantageously provided to bridge the opening 54.

The power bogie is connected to the truck body structure by separable aligning means operable to register the bogie frame members 34 in proper aligned relation with the rigid understructure 12 of such body, and detachable bolts for separably securing the interengaged aligning means in proper aligned relation and coacting with the latter to maintain the bogie frame members 34 in rigid aligned relation with the body structure so that the latter and the power bogie or dolly together will function as a unitary rigid chassis in the assembled condition of the vehicle. As will be noted in FIGS. 3–7 of the drawings, the two frame members 34 of the power bogie are receivable between the two body frame members 52 and are each provided with a pair of spaced dowel pins 55 adapted to be received in dowel holes provided in the plates 56 secured in position between the top horizontal flanges of the body frame members 51 and 52. These parts of the vehicle constitute the means for properly aligning the power bogie with the body structure. It will also be noted in the said figures, that the bottom horizontal flanges of the body frame members 51 and 52 and of the bogie frame members 34 are engaged in superposed relation in the assembled condition of the vehicle and are provided with aligned bolt holes into which are inserted the bolts 57 to rigidly secure the bogie to the body structure.

The above-described connections between the power bogie 30 and the truck body and associated mechanisms are easy to effect and the body may be raised to the position indicated in FIG. 3 any time it is desired to remove the bogie. Thus, when extensive engine overhaul must be done, the power bogie can be removed and worked upon independently of the truck body. The body, of course, can be used in association with another power bogie unit, and therefore, the downtime of the body will be materially reduced.

It will be understood from the foregoing that in removing the power bogie or dolly from the body structure, the connections between the operating parts of the power bogie and of the body structure will first have to be separated. After that has been accomplished, the bolts 57 are removed to unlock the power bogie from the body structure. The front end of the body structure is then lifted in any suitable manner to cause the body structure to pivot about the transverse axis of the rear wheel and axle set. As the front end of the body is lifted, the dowel pins 55 will automatically become disengaged from the dowel holes in the plates 56 and then the bogie frame members 34 will become disengaged from their nesting relation with the body frame members 52. When the front end of the body has been lifted sufficiently a serviceman can readily wheel the power bogie or dolly out from under the front end compartment of the body.

The installation of the power bogie is of course performed in the reverse order. The serviceman wheels the bogie in under the raised front end of the body to approximately proper registering position. The front end of the body is then lowered slowly and toward the end of its downward movement the serviceman can make such slight adjustment of the bogie as is necessary to enable the frames 34 thereof to be received between the body frame members 52. As the front end of the body continues its downward movement, with the bottom horizontal flanges of the body frame members 52 moving into engagement with the bottom horizontal flanges of the bogie frames 34, a final longitudinal adjustment of the bogie may be made by the serviceman to bring the dowel pins 55 into exact registry with the dowel holes in the plates 56. The body is then permitted to come to rest on the power bogie with the aligning pins 55 interengaged with the dowel holes and the bolt holes in the bottom flanges of the body frame members 51, 52, in registry with the bolt holes in the bottom flanges of the bogie frame members 34, and the frame members 34 and 52 in proper nested relation so that each associated pair becomes in fact one frame member. The bolts 57 are then inserted in the registered bolt holes and secured in place. After the power bogie and the body structure have been so assembled, the connections between the operating parts are made and the vehicle is ready for operation.

While a specific embodiment of the invention has been shown and described in detail to illustrate the application of the invention principles, it will be understood that the invention may be embodied otherwise without departing from such principles.

I claim:

1. A motor vehicle comprising a unitary rigid body structure extending substantially the length of the vehicle and having a power unit receiving compartment at the front end thereof and a driver's compartment located adjacent to said front end power unit compartment, a rear wheel and axle set secured to and supporting the rear end of said body structure, a drive shaft for said set carried by said body structure, and a steering wheel column mounted on said body structure so that its upper end is located in said driver's compartment and its lower end extends downwardly into said front end compartment, said body structure, by a lifting force applied to the front end thereof, being pivotal about the transverse axis of said rear wheel and axle set to raise said front end compartment a substantial distance above the normal horizontal position thereof, and said body structure having located within said front end compartment a pair of spaced longitudinally extending frame members, a manually movable, readily separable, power dolly receivable in said front end compartment into locked engagement with said body frame members, said power dolly including a pair of spaced side frame members, a front wheel and axle set for the vehicle supporting said side frame members, and a power unit for the vehicle mounted between said side frame members and between the wheels of said front wheel and axle set, said front wheel and axle set being positioned on said power dolly to make it a balanced unit capable of being readily wheeled by a serviceman under the front end of said body structure to a position beneath said front end compartment when said front end is lifted about the transverse axis of said rear wheel and axle set, aligning means operable to bring said power dolly and said body structure into proper aligned relation with said dolly side frame members carrying the full weight of the forward end of said body structure when the latter is lowered into position thereon, said aligning means including said body and said dolly frame members which are constructed and arranged to interengage in nesting relation as said body structure is lowered to fix the transverse relative positions of said power dolly and said body structure, and said aligning means including aligning elements located in spaced relation on said dolly side frame members and positioned on opposite sides of the transverse axis of said front wheel and axle set, and spaced cooperative aligning elements on said body structure separably interengageable with said aligning elements on said dolly side frame members to fix the longitudinal relative positions of said power dolly and said body structure, detachable means for separably securing together said interengaged aligning means of the aligned power unit and body structure and coacting with said interengaged aligning means to maintain said dolly side frame members in rigid aligned relation with said body structure so that the latter and said power dolly function as a unitary rigid chassis in the assembled condition of the vehicle, said detachable means being removable to enable said aligning means to separate when the front end of said body structure is again lifted about said transverse axis and thereby enable the serviceman to wheel said power dolly from under said front end compartment, means detachably connecting said power unit of the aligned power dolly to said drive shaft, and means detachably connecting said steering wheel column to said wheels of the aligned power dolly.

2. A motor vehicle such as defined in claim 1, in which said aligning elements comprise a plurality of locking elements positioned on the upper edge of each of said dolly side frame members and on opposite sides of the transverse axis of said front wheel and axle set in substantial spaced relation to such axis, and a plurality of locking elements provided with said body frame members in registered relation to said locking elements on said dolly side frame members, said locking elements on said dolly side frame members receivably engaging in interlocked relation with said locking elements provided with said body frame members when said dolly side frame members are in nested relation with said body frame members.

3. A motor vehicle such as defined in claim 1, in which said dolly side frame members are supported on said front wheel and axle set by leaf springs and have a length approximating the length of such leaf springs, and in which said dolly side frame members have vertically disposed body portions and horizontally disposed flange portions, and said body frame members have vertically disposed body portions slidably receiving therebetween said dolly side frame body portions and horizontally disposed flange portions engageable with the dolly side frame flange portions in the nested relation of said dolly side frame members and said body frame members.

4. A motor vehicle such as defined in claim 3, in which said horizontally disposed flange portions project outwardly from the lower longitudinal edges of said vertically disposed body portions of said body frame members and said dolly side frame members, and in which said dolly side frame members additionally have upper inwardly extending horizontal flanges, and said aligning elements located in spaced relation on said dolly side frame members are provided on said inwardly extending horizontal flanges.

5. A motor vehicle such as defined in claim 1, in which said means for detachably connecting said steering wheel column to said front wheels comprises a steering gear assembly including a lever arm mounted on the lower end of said steering column and located in said front end compartment, a steering rod carried by said power dolly and connected to said front wheel and axle set, and locking elements for detachably connecting said lever arm to said steering rod.

References Cited in the file of this patent
UNITED STATES PATENTS

| | | |
|---|---|---|
| 1,261,603 | Palmer | Apr. 2, 1918 |
| 1,770,279 | Morrison | July 8, 1930 |
| 1,893,609 | Austin | Jan. 10, 1933 |
| 2,228,132 | Werner | Jan. 7, 1941 |
| 2,480,047 | Reinhard | Aug. 23, 1949 |
| 2,565,666 | Schaefer | Aug. 28, 1951 |
| 2,667,230 | Duff et al. | Jan. 26, 1954 |
| 2,817,557 | Reynolds | Dec. 24, 1957 |
| 2,895,279 | Schrage | July 21, 1959 |